United States Patent [19]

Bolleter et al.

[11] 4,323,669

[45] Apr. 6, 1982

[54] PROCESS FOR PURIFICATION OF NITROCELLULOSE

[75] Inventors: William T. Bolleter, Blacksburg; Carl D. Chandler, Jr., Dublin, both of Va.

[73] Assignee: Hercules Incorporated, Wilmington, Del.

[21] Appl. No.: 171,623

[22] Filed: Jul. 23, 1980

[51] Int. Cl.³ .............................. C08B 5/04; C08B 5/10
[52] U.S. Cl. .......................................... 536/38; 536/41; 536/42
[58] Field of Search ............................. 536/38, 41, 42

[56] References Cited

U.S. PATENT DOCUMENTS

| | | | |
|---|---|---|---|
| 1,633,292 | 6/1927 | De Vries Shipley | 536/41 |
| 1,757,481 | 5/1930 | Seel | 536/41 |
| 1,818,733 | 8/1931 | Milliken | 536/42 |
| 1,911,201 | 5/1933 | Milliken | 422/163 |
| 1,995,117 | 3/1935 | Eskew | 536/42 |
| 2,039,381 | 5/1936 | Bacon | 260/148 |
| 2,077,455 | 4/1937 | Baker | 536/42 |
| 2,297,734 | 10/1942 | Wyler et al. | 260/223 |
| 2,366,880 | 1/1945 | Stern | 260/223 |
| 2,467,324 | 4/1949 | Luce | 536/41 |
| 2,776,965 | 1/1957 | Bennett et al. | 260/220 |
| 2,970,996 | 2/1961 | Silk | 536/42 |

FOREIGN PATENT DOCUMENTS

| | | | |
|---|---|---|---|
| 289387 | 1/1929 | United Kingdom | 536/41 |
| 478212 | 1/1938 | United Kingdom | 536/42 |

*Primary Examiner*—Ronald W. Griffin
*Attorney, Agent, or Firm*—Michael B. Keehan

[57] ABSTRACT

A process for purification of nitrocellulose containing residual acid from nitration is provided. In this process the nitrocellulose is cut in the presence of water to form an aqueous slurry of cut nitrocellulose fibers. The pH of the slurry is adjusted to a value of at least about 8 and the slurry is heated under pressure. The pH of the slurry is maintained above 8 during heating by addition of basic solution to the slurry. When the residual acid in the slurry is substantially completely neutralized, the fibers are separated from the slurry. The purified nitrocellulose is of reduced viscosity and satisfactory stability.

4 Claims, No Drawings

PROCESS FOR PURIFICATION OF NITROCELLULOSE

The U.S. Government has rights to this invention pursuant to Contract DAAA09-77-C-4007 issued by the U.S. Department of the Army.

This invention relates to a process of purifying nitrocellulose containing residual acid from the nitrating step in preparation of the nitrocellulose.

BACKGROUND AND PRIOR ART

Nitrocellulose resulting from the nitration of cellulose contains residual acids which must be removed from the nitrocellulose. Nitrocellulose resulting from nitration of the cellulose has a high viscosity which must be reduced so that proper rheological properties are obtained. This is particularly necessary when employing nitrocellulose in propellant as a major component thereof in order to insure propellant stability and adequate mechanical properties. Illustrative prior art processes for stabilization of nitrocellulose containing residual acidic components are described below.

U.S. Pat. No. 1,818,733 describes a process for reducing the viscosity of nitrocellulose, increasing its stability and for purification. In the process described a mixture of nitrocellulose and water is pumped at a high velocity (about 2 feet per second) through a long coil at a pressure of about 80 psi. The temperature of the nitrocellulose and water is from about 130° C. to 160° C. but temperatures as high as 180° C. are stated to be permissible. These conditions result in a reduction of the nitrogen content of the nitrocellulose and severely reduce the nitrocellulose viscosity to the point that it is unacceptable for normal propellant manufacture. The nitrocellulose is considered lacquer grade, suitable for use in plastics and paints. U.S. Pat. No. 1,911,201 discloses a modified operatus for use in conducting the process described in U.S. Pat. No. 1,818,733.

U.S. Pat. No. 2,366,880 discloses a process for the purification of nitrocellulose. In this process, preliminary steps of wringing, drowning, boiling and pulping of the nitrocellulose precede the inventive step of poaching. In the poaching step of the process the nitrocellulose is boiled first in an aqueous alkaline solution and then in water. The nitrocellulose is then separated from the liquor associated therewith after boiling continuously by continuously filtering the nitrocellulose forming a mat of nitrocellulose. The resulting mat is washed with water.

U.S. Pat. No. 2,776,965 relates to a process for the manufacture of nitrocellulose. In this invention, nitric acid esters of cellulose are produced by reacting cellulose with a nitrating mixture containing essentially nitric acid, magnesium nitrate and water, the ratio of magnesium nitrate to water being at least 1.2/1 and not more than about 2.2/1. After nitration the spent nitrating mixture is removed from the resulting nitric acid esters and stable nitric acid esters of cellulose are recovered directly.

U.S. Pat. No. 1,757,481 discloses an improvement in a method for reducing the viscosity of nitrocellulose. In the process disclosed nitrocellulose is boiled in water under pressure in an autoclave for at least 8 hours. In the process water is circulated into and out of the autoclave and from time to time an alkaline agent sufficient to maintain neutrality of the water is introduced into the circulating water. The water level in the autoclave is maintained at a level sufficient so that the nitrocellulose is immersed in the boiling solution. Undesired products are removed from the boiling solution by the introduction of steam under pressure below the water level and by the simultaneous withdrawal of any excess water at such level.

U.S. Pat. No. 2,077,455 discloses a process for reducing the quantity of residual acids in unpurified nitrated cellulose. In this process acid-wet nitrocellulose having a nitrogen content of 11.9% is first washed with 2 or 3 changes of water, the last wash being slightly alkaline, until the final water has an approximate pH value of 5 or higher. The nitrocellulose is then boiled with 10–15 times its weight of a 0.05% to 1% solution of an alkali or alkaline earth nitrite for from 3 to 4 hours. It is then washed substantially free from nitrite by means of 2 to 3 changes of fresh water.

U.S. Pat. No. 2,297,734 discloses a process for the stabilization of nitrocellulose which comprises water washing nitrocellulose to remove most of its free acid, stirring the nitrocellulose in a large excess of hot water for several hours, filtering the nitrocellulose, stirring the nitrocellulose into a cold 1–3% solution of sodium bicarbonate in water for from one hour to several days, filtering and washing the nitrocellulose with water until only a small amount of the sodium bicarbonate remains in the nitrated product, preferably an amount which produces a pH of 7.1 to 8.2 in the water. The resulting nitrocellulose is then stirred into a 0.1%–0.2% solution of dicyandiamide. The resulting nitrocellulose is said to be free from color and satisfactorily stabilized.

SUMMARY OF THE INVENTION

This invention comprises a process for purifying both commercial and military grades of nitrocellulose. In the process of this invention, unpurified nitrocellulose containing residual acid from nitration is washed with water and cut to produce small nitrocellulose fibers. The resulting slurry of cut fibers is heated to a temperature of from about 100° C. to 150° C. at a pressure of from about atmospheric to about 60 psi (gauge). During this heating step an alkaline agent is continuously added to the slurry to bring the pH to at least 8. After a relatively short time, say not to exceed about 2 hours, purified nitrocellulose is recovered after washing with water either by draining in an open vessel or by filtration. The purified nitrocellulose exhibits reduced viscosity, satisfactory stability and minimum reductions in nitrogen content.

DETAILED DESCRIPTION OF THE INVENTION

In accordance with this invention, a process is provided for purification and viscosity reduction of unpurified nitrocellulose containing residual acid from the nitration step in the preparation of the nitrocellulose, said process comprising:

(a) cutting the unpurified nitrocellulose fibers in water forming an aqueous slurry of nitrocellulose fibers comprising a dispersed nitrocellulose fiber phase and a continuous liquid phase, (b) adjusting the pH of such slurry to at least about 8 with a basic solution, (c) heating the resulting slurry to an elevated temperature and elevated pressure of from about 100° C. to about 150° C. and from about atmospheric pressure to about 60 psi (gauge), and continuously maintaining the pH of the slurry at least about 8 by the addition of basic solution during the heating of the slurry and continuing said heating for a time sufficient for the residual acid in said nitrocellulose fibers to be substantially completely neutralized, (d) separating the neutralized fibers from the continuous liquid phase of the slurry, and (e) washing the separated nitrocellulose fibers with water to effect removal of the basic solution and recovering stable nitrocellulose fibers therefrom.

In the process of this invention any form of unpurified nitrocellulose can be employed regardless of the source of the nitrocellulose.

In the process of this invention unpurified nitrocellulose is initially cut into small fibers forming a slurry comprising unpurified nitrocellulose fibers as the dispersed phase and water as the continuous phase. The nitrocellulose fibers can be cut by pumping the acidic fibers in water through any of a variety of disc or conical refiners which are manufactured of acid resistant materials of construction. The fibers are preferably cut to a size having a freeness of from about 350 to about 560 as measured by the Standard Canadian Freeness Test (TAPPI Standard 227 m 46).

The concentration of cut nitrocellulose fibers in the resulting aqueous slurry is from about 2% to about 10% by weight nitrocellulose fibers. Slurries should not contain more than about 10% of nitrocellulose fibers because of potential problems with pluggage of transfer lines and other process equipment.

Following the cutting operation described above, the slurry of unpurified nitrocellulose fibers is next mixed with a basic solution in an amount sufficient to adjust the pH of the continuous phase of the slurry to at least about 8.0. Minor variations of the pH below 8 but above neutral will be normally encountered in the beginning of the neutralization reaction. If, however, the pH is not maintained at a level of at least about 8 during the majority of the heating step, sufficient driving force is not available to rapidly extract acid species from the fibers. Particularly suitable basic solutions that can be employed are aqueous solutions of sodium carbonate, sodium bicarbonate, sodium hydroxide, potassium carbonate, potassium bicarbonate, potassium hydroxide, and aqueous solutions of other alkaline and alkaline earth carbonates, bicarbonates, hydroxides, and the like. Aqueous sodium carbonate is the preferred basic solution which is employed in adjusting the pH of the slurry of nitrocellulose fibers. The sodium carbonate solution can be employed in concentrations of about 1% to about 10% by weight of sodium carbonate.

Following adjustment of the pH of the slurry of nitrocellulose fibers, the slurry is heated to an elevated temperature and to an elevated pressure. To accomplish heating to an elevated pressure the slurry is charged to a vessel adapted to operate under pressure. The vessel can be, for example, a batch type kettle reactor or a tube type reactor adapted to operate at a preset pressure and capable of use in a continuous process mode. The reaction vessel must also be adapted for addition of basic solution to the vessel during the course of the stabilization process. This is necessary since during the course of the stabilization process the pH of the continuous phase will fall as acid species are extracted and neutralized and pH is adjusted to a level of at least about 8 or above during the course of the purification step in order to obtain reasonable reaction times and to obtain proper viscosity and stability of the purified nitrocellulose.

Addition of aqueous solution can be readily accomplished through the use of metering pumps or other suitable mechanical arrangements which can be used to inject additional basic solution into the heated and pressurized slurry of nitrocellulose fibers. The pH of the slurry is continuously monitored during the course of the heating step under pressure. Monitoring of pH is accomplished by removing solution from the pressurized reactor through a filter and valve arrangement which allows passage of only the aqueous phase and reduces the solution to ambient pressure. The pH can be measured using any one of a number of commercially available process or laboratory pH meters.

The length of time of heating of the slurry of nitrocellulose under pressure to effect neutralization of substantially all of the residual acid within the unpurified nitrocellulose will depend upon the source of the nitrocellulose, the concentration of the nitrocellulose in the slurry, and the pH, temperature and pressure under which the heating step is operated. In general, however, at temperatures of at least 100° C. and pressures greater than ambient with a pH of at least 8, the time required to substantially completely neutralize the residual acids within the nitrocellulose fibers will vary from about 30 minutes to about 2 hours. Adjustment of the process variables within the teachings of this invention and with minimum experimentation can be readily determined by one skilled in the art. Neutralization of substantially all the residual acid can be determined, for example, by continuously taking samples of nitrocellulose slurry from the reaction vessels and evaluating the stability of the slurry utilizing the methyl violet heat test as specified in MIL-N-244 and method 4041.2 in MIL-STD-286B. Substantially complete neutralization is achieved when the samples of slurry are stable to a change of color for at least 26 minutes using the methyl violet heat test. Following the heating of the slurry under pressure at appropriate pH levels as specified above, the neutralized nitrocellulose slurry is then subjected to a separation step wherein the neutralized fibers are separated from the continuous liquid phase of the slurry. The separation step is preferably conducted by filtering the slurry through a drum or belt filter. The separation step may also be conducted by draining the water from the slurry in an open tank. The separated nitrocellulose fibers are then washed with water at about 15° C. or higher, as required, to effect removal of residual basic solution from the surface of the nitrocellulose fibers and the resulting stable fibers are recovered and kept under water until use.

In the process of this invention, purification of low grade nitrocellulose (nitrogen content less than 13.00%) derived either from nitration of cotton linters or wood pulp cellulose requires a minimum of about 30 minutes in the heating step under pressure in accordance with this invention at 130° C. to 140° C. to produce a nitrocellulose exhibiting a stability of 26 minutes or greater using the aforementioned stability test. Longer times may be required for other grades of nitrocellulose such as high nitrogen content (greater than 13.00% nitrogen) nitrocellulose derived from either cotton linters or wood pulp cellulose.

The following examples more fully illustrate this invention. In the examples and throughout the specification parts and percentages are by weight unless otherwise specified.

EXAMPLE 1

About 6 parts of unpurified nitrocellulose (pulp) containing 12.60% nitrogen after nitration is added to 100 parts of water. The resulting mixture is pumped through an acid resistant disc refiner (attrition mill) to produce a slurry of nitrocellulose fibers in water, said fibers having a freeness of from 350 to 560 as measured by the Standard Canadian Freeness Test (TAPPI Standard 227 m 46). The pH of the resulting slurry of nitrocellulose in water is in the acidic to neutral range. This slurry is charged to a kettle type reaction vessel and heated to a temperature of 140° C. which produces a pressure in the vessel of about 40 psi (gauge). The mixture is agitated with an air driven marine impellor and heated under pressure for 60 minutes. The pH of the nitrocellulose slurry is maintained during the course of the reaction at about pH of 8. At the end of 60 minutes, heating is stopped and the slurry is cooled to ambient temperature. The slurry is then filtered to remove the continuous phase from the nitrocellulose and the nitrocellulose is washed with two to three volumes of water. The washed nitrocellulose is dried and analyzed for viscosity according to MIL-N-244. The results of viscosity and stability tests are set forth in Table 1.

EXAMPLES 2–4

Examples 2–4 are conducted following the procedure of Example 1 with a change in variables as set forth in Table 1 below.

TABLE 1

| | Reaction Time (min.) | Pressure psig | Temperature °C. | Product Viscosity* sec. | Product Stability** (min.) |
|---|---|---|---|---|---|
| Example 1 | | | | | |
| Low nitrogen content pulp nitrocellulose | 60 | 62 | 142 | 0.5 | 27 |
| Example 2 | | | | | |
| Low nitrogen content linters nitrocellulose | 90 | 38 | 140 | 21 | 35 |
| Example 3 | | | | | |
| High nitrogen content linters nitrocellulose | 75 | 46 | 143 | 3 | 28 |
| Example 4 | | | | | |
| High nitrogen content pulp nitrocellulose | 90 | 45 | 142 | 10 | 26 |

*Viscosity (sec.) measured according to MIL-N-224.
**Stability (min.) measured according to the methyl violet test in MIL-N-244.

The process of this invention is a rapid and economical process for stabilization of nitrocellulose. The time consuming acid boil step of the prior art is eliminated. Energy consumption is minimized by reducing volumes of hot water required for processing in either a batch or continuous operation. Water washing steps are reduced and the purification apparatus requires considerable less space than in conventional process apparatus. The process is easy to operate and can be automated.

What we claim and desire to protect by Letters Patent is:

1. A process is provided for purification and viscosity reduction of unpurified nitrocellulose containing residual acid from the nitration step in the preparation of the nitrocellulose, said process comprising:
   (a) cutting the unpurified nitrocellulose fibers in water forming an aqueous slurry of nitrocellulose fibers comprising a dispersed nitrocellulose fiber phase and a continuous liquid phase,
   (b) adjusting the pH of such slurry to at least about 8 with the basic solution,
   (c) heating the resulting slurry to an elevated temperature of at least 100° C. to about 150° C. and at a pressure of from about atmospheric pressure to about 60 psi (gauge), and maintaining the pH of the slurry at at least about 8 by the addition of basic solution during the heating of the slurry under pressure and continuing said heating for a time sufficient for the residual acid in said nitrocellulose fibers to be substantially completely neutralized,
   (d) separating the neutralized fibers from the continuous liquid phase of the slurry, and
   (e) washing the separated nitrocellulose fibers with water to effect removal of the basic solution and recovering stable nitrocellulose fibers therefrom.

2. The process of claim 1 in which the basic solution employed to adjust the pH of the slurry is aqueous sodium carbonate.

3. The process of claim 1 or 2 in which the nitrocellulose fibers are cut to a freeness of from about 350 to 560 based on the Standard Canadian Freeness Test.

4. The process of claim 1, 2 or 3 in which the aqueous slurry of nitrocellulose fibers of step (a) comprises from about 2% to about 10% by weight of nitrocellulose.

* * * * *